(12) United States Patent
Gjerde et al.

(10) Patent No.: US 11,468,023 B2
(45) Date of Patent: *Oct. 11, 2022

(54) COMPUTER-BASED DATA COLLECTION, MANAGEMENT, AND FORECASTING

(71) Applicant: Blackhawk Network, Inc., Pleasanton, CA (US)

(72) Inventors: Anders R. Gjerde, Pleasanton, CA (US); William Palarca, San Francisco, CA (US); Rick Myers, Brentwood, CA (US); Calvin Tamano, Union City, CA (US); Charissa Fanucchi, Livermore, CA (US); Peggah Elahi, San Ramon, CA (US); Zohra Qasimi, Torrance, CA (US); Gemma Asin Laguna, Pleasanton, CA (US); Valerie R. Hancock, Livermore, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,829

(22) Filed: Jan. 12, 2021

(65) Prior Publication Data

US 2021/0133171 A1    May 6, 2021

Related U.S. Application Data

(63) Continuation of application No. 15/736,892, filed as application No. PCT/US2016/038346 on Jun. 20, 2016, now Pat. No. 10,922,293.

(Continued)

(51) Int. Cl.
*G06F 16/22* (2019.01)
*G06F 16/28* (2019.01)

(52) U.S. Cl.
CPC ............ *G06F 16/22* (2019.01); *G06F 16/285* (2019.01)

(58) Field of Classification Search
CPC .............................. G06F 16/22; G06F 16/285
See application file for complete search history.

(56) References Cited

U.S. PATENT DOCUMENTS

| 7,552,066 B1 | 6/2009 | Landvater |
| 7,680,685 B2 | 3/2010 | Ouimet et al. |

(Continued)

FOREIGN PATENT DOCUMENTS

| EP | 1647927 A1 | 4/2006 |
| WO | 2016209764 A1 | 12/2016 |

OTHER PUBLICATIONS

Filing receipt and specification for provisional patent application entitled "Computer-Based Data Collection, Management, and Forecasting," by Anders R. Gjerde, et al., filed Jun. 21, 2015 as U.S. Appl. No. 62/182,601.

(Continued)

*Primary Examiner* — James Trujillo
*Assistant Examiner* — Michal Bogacki
(74) *Attorney, Agent, or Firm* — Barnes & Thornburg LLP; Jerry C Harris, Jr.

(57) ABSTRACT

A method implemented by a computer comprising collecting historical data for a plurality of items; categorizing each of the plurality of items; assigning at least one of the plurality of items as an index item for at least another of the plurality of items; collecting data for a plurality of context parameters related to at least one of the plurality of items; and forecasting a value for one of the plurality of items needed over a future period of time, wherein the method reduces a data storage capacity requirement for the computer and increases said computer's processing speed.

17 Claims, 1 Drawing Sheet

Related U.S. Application Data

(60) Provisional application No. 62/182,601, filed on Jun. 21, 2015.

(56) References Cited

U.S. PATENT DOCUMENTS

| | | |
|---|---|---|
| 8,140,381 B1 | 3/2012 | Wu et al. |
| 8,352,300 B2 | 1/2013 | Notani et al. |
| 8,392,228 B2 | 3/2013 | Mulukutla et al. |
| 10,019,675 B2 | 7/2018 | Weissman |
| 10,311,455 B2 | 6/2019 | Notani et al. |
| 2002/0169657 A1 | 11/2002 | Singh et al. |
| 2004/0260600 A1 | 12/2004 | Gross |
| 2005/0114196 A1 | 5/2005 | Schoenmeyr |
| 2006/0206365 A1 | 9/2006 | Boardman et al. |
| 2008/0103874 A1 | 5/2008 | Zimmermann |
| 2010/0138264 A1 | 6/2010 | Faris et al. |
| 2013/0346150 A1 | 12/2013 | Beddo et al. |
| 2014/0067466 A1 | 3/2014 | Xiao et al. |
| 2015/0134413 A1 | 5/2015 | Deshpande et al. |
| 2018/0137455 A1* | 5/2018 | Mack ............... G06Q 10/04 |

OTHER PUBLICATIONS

Foreign communication from a related counterpart application—International Preliminary Report on Patentability, PCT/JS2016/038346, dated Jan. 4, 2018, 9 pages.

Foreign communication from a related counterpart application—International Search Report and Written Opinion, PCT/US2016/038346, dated Sep. 22, 2016, 12 pages.

* cited by examiner

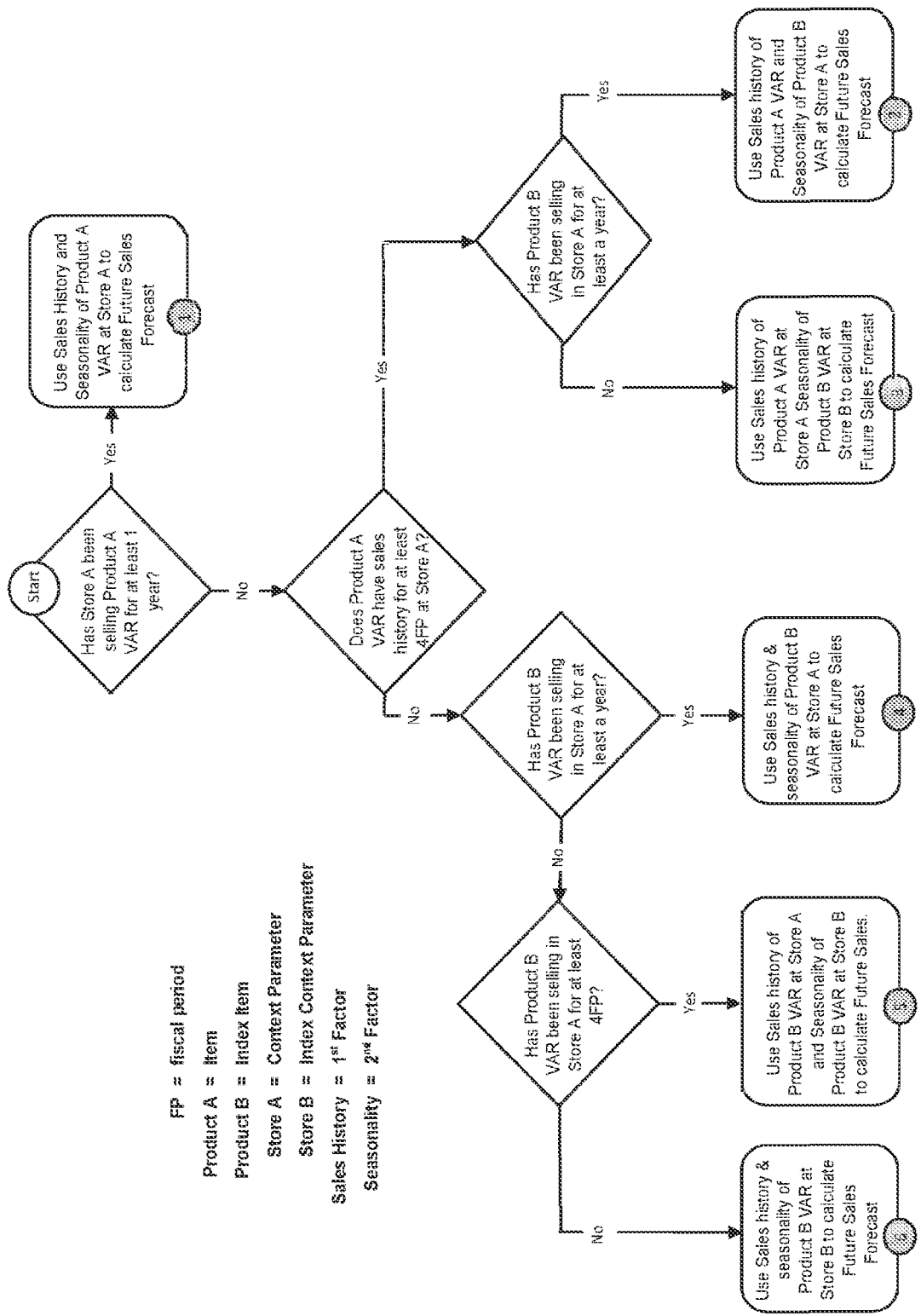

COMPUTER-BASED DATA COLLECTION, MANAGEMENT, AND FORECASTING

CROSS-REFERENCE TO RELATED APPLICATIONS

This application is a continuation application claiming priority to U.S. patent application Ser. No. 15/736,892 filed Dec. 15, 2017, entitled, "Computer-Based Data Collection, Management, and Forecasting," which is a filing under 35 U.S.C. § 371 of International Application No. PCT/US2016/038346 filed Jun. 20, 2016, entitled "Computer-Based Data Collection, Management, and Forecasting," claiming priority of U.S. Provisional Application No. 62/182,601 filed on Jun. 21, 2015, both of which are incorporated by reference herein in their entirety.

TECHNICAL FIELD

The disclosure relates to the management of data and forecasting based on said data.

BACKGROUND

Traditional statistical forecast methods require upward of 3 years of data history to determine factors which allow for forecasting of data values.

BRIEF DESCRIPTION OF THE DRAWING

FIG. 1 is a flow diagram of a data management technique as disclosd therein.

DESCRIPTION

Today's information management requires unprecedented data storage capacity and processing speed. It also promotes an accelerated pace of business—shorter life cycles, new innovations (e.g., in products, services or markets). Disclosed herein are several aspects concerning how information and/or data can be used to enable better decisions when the environment is changing so rapidly. In some cases (e.g., for some products or services or markets), there exists ample historical data on which to base decisions, but in other cases there may be very little or no historical data. Disclosed herein is an intelligent and efficient filter or algorithm that maximizes the use of available data and converts said data into actionable or meaningful information; thus, optimally using the available data so each situation is leveraging the most relevant historical information available. As mentioned above, current (and future) information management requires a massive amount of data storage capacity and extreme processing speeds. The instantly disclosed processes and methods allow computer-implemented information management systems to operate with much reduced data storage capacities; thus increasing the systems processing speeds. The disclosed improvements to computer system functionality and efficiency arise from filtering each situation (e.g., customer and product combination) at its lowest level to determine the most relevant data and applying the determination to generate forecasts. Moreover, as time passes and the algorithm or filter is refreshed, the data on which a forecast is based (as new history is generated) will be updated and a determination is made regarding whether a forecast method can change from being an indexed forecast to using its own history for forecasting. Everything else being equal, a forecast generated based on its own history is preferable/better than a forecast that is generated based on index values. As such, the solutions described herein improve computer systems forecasting results with efficient and intelligent data use via a reduction in required data storage capacity and concomitant increases in processing speed.

The data storage, management, and forecasting techniques disclosed herein allow the disclosed computers and computer systems to have improved functionality for data forecasting when an amount of data less than what is normally needed for forecasting is stored in the computer/computer systems. That is, the disclosed techniques allow accurate forecasting when the computer system is lacking robust data storage, thus enabling the computer/computer systems and computer-implemented methods disclosed herein to approximate the forecasting accuracy of machines having robust data storage.

Embodiments of the disclosure utilize data (e.g., historical data) which is collected over a period of time (e.g., by a data collection and management computer system) for any number of items to forecast a value of the items during a future period of time. The method of forecast is based on the length of the period of time over which the historical data was collected.

Data regarding a particular item (which can be a physical article, a virtual representation of a physical article, a service performed by a person or thing, etc.) can be collected continuously over time by a data collection computer/computer system which is configured to receive data from data generating computers and to store said data for forecasting. Not only does the data collection computer/computer system collect the data, but the data is managed, by maintaining the data values, and also analyzing the data values. For example, the data collection computer/computer system may determine an item belongs in one or more particular categories of items, and part of the datastore of the data collection computer may be reserved for storing a categorization of the items. Categorization of an item may be based on, for example, industry of use, technology of use (e.g., open-loop processing system, closed-loop processing system), age market, geographical location, and any other category known in the art with the aid of this disclosure. The analysis and storage of categorization of analysis may take place concurrently, concomitantly, or separately, with the data collection of the items. Moreover, categorization may be determined periodically and such categorizations of an item may be updated upon the periodic categorization determination.

Data regarding a context parameter of a particular item can be collected continuously over time by a data collection computer/computer system which is configured to receive data from data generating computers and to store said data for forecasting. Not only does the data collection computer/computer system collect the data, but the data is managed, by maintaining the data values, and also analyzing the data values. For example, the data collection computer/computer system may determine a context parameter is associated with one or more items and/or indexed items, and part of the datastore of the data collection computer may be reserved for storing associations of the context parameter with the items and/or indexed items. The analysis and storage of categorization of analysis may take place concurrently, concomitantly, or separately, with the data collection of the context parameter. Moreover, associations may be determined periodically and such associations of an item may be updated upon the periodic association determination.

Each item in the data collection computer/computer system may be indexed (e.g., associated with) another item in the same category. The indexing (e.g., the association) of a second item with a first item may be stored in the same or a different part of the datastore as the historical data, categorization data, or both. Each item may be forecasted. In embodiments, an item which is forecasted using an index item may itself be the index item for another item to be forecasted.

For each item to be forecasted, the solution implemented by one or more computers utilizes a sequence of steps to generate forecasts based on the best information available. The solution calculates at least one factor depending on which information is available, which is used to make the forecast.

Items can be any item, for example and without limitation: products sold at a store, food which is eaten, natural gas which is consumed, the number of hurricanes passing through a particular geographic location, automobiles in a crash, etc.

Context for the item is also used in the forecast and historical data. For example, the context for an item may be that it is sold in a particular store, used in manufacture of a particular automobile, performed in a particular month, performed/used/sold in a particular geographic location/area, etc. Each context parameter may be collected and stored in the data collection computer/computer system. Each context parameter in the data collection computer/computer system may be indexed (e.g., associated with) another context parameter in the same category. The indexing (e.g., the association) of a second item with a first item may be stored in the same or a different part of the datastore as the historical data, categorization data, or both.

Factors can be any factor such as historical data value(s) (e.g., sales history, services performed, games won) and frequency of occurrence of an event (e.g., sale of a product, performance of a service, winning a game, seasonality). A seasonality can have different effect on the adjustment of the indices based on the time of occurrence of the event and the geographical location of the event.

The period of time for historical data collected can be any period of time, e.g., 1 sec, 30 sec, 1 minute, 5 minutes, 30 minutes, 1 hour, 12 hours, 24 hours, 1 week, 1 month, 1 year, 2 years, 3 years, or more.

The future period of time over which the data is forecast can be any period of time accounted for in the calculation of the forecast, for example, 1 year (annual forecast), 6 months (semi-annual), 1 month (monthly forecast), 1 week (weekly forecast), etc.

The forecasted values are determined using index variables, such as index items and index context parameter for each of the item and index item. That is, an item can be indexed (e.g., associated) to another item (i.e., the index item), and the context parameter can be indexed (e.g., associated) to another context parameter (i.e., the index context parameter).

If an item has at least one full forecast cycle (e.g., one year of history of historical data), then the computer implemented solution uses the item's own history to forecast both a first factor and the item forecast.

If an item has short history of historical data, less than one full forecast cycle (e.g., 4 to 12 fiscal periods (FP)), then the computer implemented solution calculates the first factor based on an index value (described below), and the item forecast (e.g., based on a period of time, e.g., annually) is calculated based on 3 FPs of historical data.

If an item has a very short history of historical data (e.g., <3 FPs of historical data), then both the first factor and the item forecast are calculated based on index values.

In a particular embodiment, if an item has at least one year of history, then the computer implemented solution uses the item's own history to forecast both seasonality and annual forecast quantity. If an item has short history (e.g., 4 to 12 Fiscal Periods (FP)), then seasonality is calculated based on an index value, and the annual forecast is calculated based on 3 FPs of history.

If an item has <3 FPs of history, then both seasonality and forecast quantity are calculated based on index values.

FIG. 1 shows a flow diagram of the disclosed data management technique. The period of time over which the historical data is analyzed is shown as 1 year and relative to fiscal period (FP). Product A is the item to be forecasted. Product B is the item which is indexed with Product A, i.e., the index item. Product A and Product B are related in that they are categorically similar items, as previously determined by the data collection computer/computer system. Store A (the context parameter) and Store B (the indexed context parameter) were previously associated with one another (partnered as context parameter and index context parameter) because both Store A and Store B sell Product A and/or Product B. The term "FP" is defined as fiscal period. The value for the first factor (sales history) of Product A is used for Boxes 1, 2, and 3. The value for the first factor (sales history) of Product B is used for Boxes 4, 5, and 6. The value for the second factor (seasonality) of Product A is used for Box 1. The value for the second factor (seasonality) of Product B is used for Boxes 2 to 6. In Boxes 1, 2, and 4, the first and second factors are both used with reference to Store A (the context parameter). In Boxes 3 and 5, the first factor (sales history) is used with reference to Store A (the context parameter), and the second factor (seasonality) is used with reference to Store B (the index context parameter). Box 6 uses the first and second factors with reference to Store B (the index context parameter).

EXAMPLE 1

In Example 1, the quantity of a particular product (item to be forecasted and which has historical data stored) is to be supplied to a customer company (e.g., which sells the product). So a customer can be a grocery chain with a certain number of stores. In the forecast, each customer and product combination has a store count attribute associated thereto. For example Product A in Customer X is expected to sell in 100 stores; whereas Product B in Customer Y is selling in 200 stores. The use of this store count attribute is described below.

Product Index—Index value for Product A is the % we expect Product A to sell (or ship) relative to Product B. Index Products (like Product B) are determined based on adequate sales (or shipment history). When we calculate Sales (or shipment) forecast for an indexed product we scale the index forecast (up or down) based on Store Count (see Quantity Forecast below).

Seasonality is calculated first: Calculated as a % of sales (or shipment) per forecast period in a year (in our case 13 Fiscal Periods), always adding up to 100% (for a year). When the year starts over, the seasonal pattern repeats.

Quantity Forecast: Uses seasonality to calculated an annual forecast as follows:

Method A used if Product A (product we are forecasting) has history for 4 or more FPs: sum of last 3 FPs Sales (or Shipment) history/last 3 FPs seasonality.

Method B used if Product A (product we are forecasting) does not have at least 4 FPs of history: sum of Product B (index Product) for 3 FPs Sales (or Shipment) Forecast/sum of same 3 FPs Seasonality for Product A.

When we use index values to calculate Quantity Forecast, we adjust the forecast values by Customer store count—for example, if Product A is indexed to Product B (both in Customer X), and Product A will sell in 100 stores whereas Product B is selling in 200 stores, then the Quantity Forecast for Product A is adjusted by the following ratio: 100/200=0.5.

Final Forecast is Sales (or Shipment) forecast for a specific future FP (e.g., FP6), calculated as follows: Quantity Forecast*Seasonality % in FP6

EXAMPLE 2

Each Product is set up with an accompanying Index Product with an Index value, and each Customer is set up with an accompanying Index Customer with an Index value. The index lookup (for seasonality and forecast quantity) works as follows for forecasting for Product "A" in Customer "X":
1) Product A is indexed to Product B at 80%, meaning we think Product A will sell 80% of Product B (index Product);
2) If Product A in Customer X has a short history, the solution looks for Product B (index Product) in Customer X (itself). Product A will use Product B's data in Customer X to forecast (at 80%) if it exists;
3) If the above doesn't exist, then the solution looks for data for Product A (itself) in Customer Y (index Customer);
4) If the above doesn't exist, then the solution will index to Product B (index product) in Customer Y (index DP).

All of, or a portion of, the data collection computer/computer system described above may be implemented on any particular machine, or machines, with sufficient processing power, memory resources, and throughput capability to handle the necessary workload placed upon the computer, or computers. The computer system may include a processor (which may be referred to as a central processor unit or CPU) that is in communication with memory devices including secondary storage, read only memory (ROM), random access memory (RAM), input/output (I/O) devices, and network connectivity devices. The processor may be implemented as one or more CPU chips.

It is understood that by programming and/or loading executable instructions onto the computer system, at least one of the CPU, the RAM, and the ROM are changed, transforming the computer system in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage is typically comprised of one or more disk drives or tape drives and is used for non-volatile storage of data and as an over-flow data storage device if RAM is not large enough to hold all working data. Secondary storage may be used to store programs which are loaded into RAM when such programs are selected for execution. The ROM is used to store instructions and perhaps data which are read during program execution. ROM is a non-volatile memory device which typically has a small memory capacity relative to the larger memory capacity of secondary storage. The RAM is used to store volatile data and perhaps to store instructions. Access to both ROM and RAM is typically faster than to secondary storage. The secondary storage, the RAM, and/or the ROM may be referred to in some contexts as computer readable storage media and/or non-transitory computer readable media.

I/O devices may include printers, video monitors, liquid crystal displays (LCDs), touch screen displays, keyboards, keypads, switches, dials, mice, track balls, voice recognizers, card readers, paper tape readers, or other well-known input devices.

The network connectivity devices may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices may enable the processor to communicate with the Internet or one or more intranets. With such a network connection, it is contemplated that the processor might receive information from the network, or might output information to the network in the course of performing the above-described method steps. Such information, which is often represented as a sequence of instructions to be executed using processor, may be received from and outputted to the network, for example, in the form of a computer data signal embodied in a carrier wave.

Such information, which may include data or instructions to be executed using processor for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor executes instructions, codes, computer programs, scripts which it accesses from hard disk, floppy disk, optical disk (these various disk based systems may all be considered secondary storage), ROM, RAM, or the network connectivity devices. While only one processor is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage, for example, hard drives, floppy disks, optical disks, and/or other device, the ROM, and/or the RAM may be referred to in some contexts as non-transitory instructions and/or non-transitory information.

In an embodiment, the computer system may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system to provide the functionality of a number of servers that is not directly bound to the number of computers in the computer system. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system, at least portions of the contents of the computer program product to the secondary storage, to the ROM, to the RAM, and/or to other non-volatile memory and volatile memory of the computer system. The processor may process the executable instructions and/or data structures in part by directly accessing the computer program product, for example by reading from a CD-ROM disk inserted into a disk drive peripheral of the computer system. Alternatively, the processor may process the executable instructions and/or data structures by remotely accessing the computer program product, for example by downloading the executable instructions and/or data structures from a remote server through the network connectivity devices. The computer program product may comprise instructions that promote the loading and/or copying of data, data structures, files, and/or executable instructions to the secondary storage, to the ROM, to the RAM, and/or to other non-volatile memory and volatile memory of the computer system.

In some contexts, the secondary storage, the ROM, and the RAM may be referred to as a non-transitory computer readable medium or a computer readable storage media. A dynamic RAM embodiment of the RAM, likewise, may be referred to as a non-transitory computer readable medium in that while the dynamic RAM receives electrical power and is operated in accordance with its design, for example during a period of time during which the computer is turned on and operational, the dynamic RAM stores information that is written to it. Similarly, the processor may comprise an internal RAM, an internal ROM, a cache memory, and/or other internal non-transitory storage blocks, sections, or components that may be referred to in some contexts as non-transitory computer readable media or computer readable storage media.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed. The following numbered entries represent a non-exhaustive collection of exemplary embodiments of the instantly disclosed subject matter:

What is claimed is:

1. A method implemented by a computer which reduces a data storage capacity requirement for the computer and increases the computer's processing speed, the method comprising:
   collecting historical data for a plurality of items;
   categorizing each of the plurality of items;
   assigning at least one of the plurality of items as an index item for at least another of the plurality of items, wherein the assigning enables accurate forecasting, wherein forecasting comprises:
   (1) using a first factor and a second factor with reference to a first context parameter of the plurality of context parameters to calculate the forecast value of the one of the plurality of items needed over the future period of time, if a period of time for the historical data collected for the one of the plurality of items needed over the future period of time with reference to the first context parameter is above a first threshold, wherein the first factor and the second factor are related to the plurality of items, (2) using the first factor of the one of the plurality of items needed over the future period of time with reference to the first context parameter of the plurality of context parameters and using the second factor of the index item with reference to the first context parameter, to calculate the forecast value of the one of the plurality of items needed over the future period of time, if the period of time for the historical data collected for the one of the plurality of items needed over the future period of time is below the first threshold with reference to the first context parameter and above a second threshold with reference to the first context parameter, and if a period of time for the historical data collected for the index item with reference to the first context parameter is greater than a third threshold;

(3) using the first factor of the one of the plurality of items needed over the future period of time with reference to the first context parameter and using the second factor of the index item with reference to an index context parameter of the plurality of context parameters, to calculate the forecast value of the one of the plurality of items needed over the future period of time, if the period of time for the historical data collected for the one of the plurality of items needed over the future period of time is below the first threshold with reference to the first context parameter and above the second threshold with reference to the first context parameter, and if the period of time for the historical data collected for the index item with reference to the first context parameter is less than the third threshold;

(4) using a first factor of the index item with reference to the first context parameter and using the second factor of the index item with reference to the first context parameter, to calculate the forecast value of the one of the plurality of items needed over the future period of time, if the period of time for the historical data collected for the one of the plurality of items needed over the future period of time is below the first threshold with reference to the first context parameter and below the second threshold with reference to the first context parameter, and if the period of time for the historical data collected for the index item with reference to the first context parameter is greater than the third threshold;

(5) using the first factor of the index item with reference to the first context parameter and using the second factor of the index item with reference to the index context parameter, to calculate the forecast value of the one of the plurality of items needed over the future period of time, if the period of time for the historical data collected for the one of the plurality of items needed over the future period of time is below the first threshold with reference to the first context parameter and below the second threshold with reference to the first context parameter, if the period of time for the historical data collected for the index item with reference to the first context parameter is less than the third threshold, and if the period of time for the historical data collected for the index item with reference to the first context parameter is greater than a fourth threshold; or (6) using the first factor of the index item with reference to the index context parameter and using the second factor of the index item with reference to the index context parameter, to calculate the forecast value of the one of the plurality of items needed over the future period of time, if the period of time for the historical data collected for the one of the plurality of items needed over the future period of time is below the first threshold with reference to the first context parameter and below the second threshold with reference to the first context parameter, if the period of time for the historical data collected for the index item with reference to the first context parameter is less than the third threshold, and if the period of time for the historical data collected for the index item with reference to the first context parameter is less than the fourth threshold.

2. The method of claim 1, further comprising collecting data for a plurality of context parameters related to at least one of the plurality of items.

3. The method of claim 1, further comprising forecasting a value for one of the plurality of items needed over a future period of time.

4. The method of claim 2, further comprising forecasting a value for one of the plurality of items needed over a future period of time.

5. The method of claim 1, wherein the first threshold is one full forecast cycle, wherein the second threshold is a first subset of one full forecast cycle, wherein the third threshold is one full forecast cycle, and wherein the fourth threshold is a second subset of one full forecast cycle.

6. The method of claim 2, wherein the first threshold is one full forecast cycle, wherein the second threshold is a first subset of one full forecast cycle, wherein the third threshold is one full forecast cycle, and wherein the fourth threshold is a second subset of one full forecast cycle.

7. The method of claim 3, wherein the first threshold is one full forecast cycle, wherein the second threshold is a first subset of one full forecast cycle, wherein the third threshold is one full forecast cycle, and wherein the fourth threshold is a second subset of one full forecast cycle.

8. The method of claim 4, wherein the first threshold is one full forecast cycle, wherein the second threshold is a first subset of one full forecast cycle, wherein the third threshold is one full forecast cycle, and wherein the fourth threshold is a second subset of one full forecast cycle.

9. The method of claim 1, wherein the first threshold is one year, wherein the second threshold is four fiscal periods, wherein the third threshold is one year, and wherein the fourth threshold is four fiscal periods.

10. The method of claim 2, wherein the first threshold is one year, wherein the second threshold is four fiscal periods, wherein the third threshold is one year, and wherein the fourth threshold is four fiscal periods.

11. The method of claim 3, wherein the first threshold is one year, wherein the second threshold is four fiscal periods, wherein the third threshold is one year, and wherein the fourth threshold is four fiscal periods.

12. The method of claim 4, wherein the first threshold is one year, wherein the second threshold is four fiscal periods, wherein the third threshold is one year, and wherein the fourth threshold is four fiscal periods.

13. A data collection, management, and forecasting computer system comprising:
 a datastore
 one or more processors; and
 one or more non-transitory computer readable memory storing instructions which when executed by the one or more processors causes the computer system to reduce a data storage capacity requirement for the computer system and increase the one or more processors' processing speed by:

collecting historical data for a plurality of items;

storing the historical data for a plurality of items in a first part of the datastore;

categorizing each of the plurality of items;

storing a categorization of each of the plurality of items in a second part of the datastore;

assigning at least one of the plurality of items as an index item for at least another of the plurality of items, wherein the assigning enables forecasting a value, wherein forecasting the value comprises:

(1) use a first factor and a second factor with reference to a first context parameter of the plurality of context parameters to calculate the forecast value of the one of the plurality of items needed over the future period of time, if a period of time for the historical data collected for the one of the plurality of items needed over the future period of time with reference to the first context parameter is above a first threshold, wherein the first factor and the second factor are related to the plurality of items, (2) use the first factor of the one of the plurality of items needed over the future period of time with reference to the first context parameter of the plurality of context parameters and using a second factor of the index item with reference to the first context parameter, to calculate the forecast value of the one of the plurality of items needed over the future period of time, if the period of time for the historical data collected for the one of the plurality of items needed over the future period of time is below the first threshold with reference to the first context parameter and above a second threshold with reference to the first context parameter, and if a period of time for the historical data collected for the index item with reference to the first context parameter is greater than a third threshold;

(3) use the first factor of the one of the plurality of items needed over the future period of time with reference to the first context parameter of the plurality of context parameters and using the second factor of the index item with reference to an index context parameter of the plurality of context parameters, to calculate the forecast value of the one of the plurality of items needed over the future period of time, if the period of time for the historical data collected for the one of the plurality of items needed over the future period of time is below the first threshold with reference to the first context parameter and above the second threshold with reference to the first context parameter, and if the period of time for the historical data collected for the index item with reference to the first context parameter is less than the third threshold;

(4) use the first factor of the index item with reference to the first context parameter and using the second factor of the index item with reference to the first context parameter, to calculate the forecast value of the one of the plurality of items needed over the future period of time, if the period of time for the historical data collected for the one of the plurality of items needed over the future period of time is below the first threshold with reference to the first context parameter and below the second threshold with reference to the first context parameter, and if the period of time for the historical data collected for the index item with reference to the first context parameter is greater than the third threshold;

(5) use the first factor of the index item with reference to the first context parameter and using the second factor of the index item with reference to the index context parameter, to calculate the forecast value of the one of the plurality of items needed over the future period of time, if the period of time for the historical data collected for the one of the plurality of items needed over the future period of time is below the first threshold with reference to the first context parameter and below the second threshold with reference to the first context parameter, if the period of time for the historical data collected for the index item with reference to the first context parameter is less than the third threshold, and if the period of time for the historical data collected for the index item with reference to the first context parameter is greater than a fourth threshold; or (6) use the first factor of the index item with reference to the index context parameter and using the second factor of the index item with reference to the index context parameter, to calculate the forecast value of the one of the plurality of items needed over the future period of time, if the period of time for the historical data collected for the one of the plurality of items is below the first threshold with reference to the first context parameter and below the second threshold with reference to the first context parameter, if the period of time for the historical data collected for the index item with reference to the first context parameter is less than the third threshold, and if the period of time for the historical data collected for the index item with reference to the first context parameter is less than the fourth threshold.

14. The data collection, management, and forecasting computer system of claim 13, further comprising storing the historical data for the plurality of context parameter in a third part of the datastore.

15. The data collection, management, and forecasting computer system of claim 13, further comprising forecasting a value for one of the plurality of items needed over a future period of time.

16. The data collection, management, and forecasting computer system of claim 14, further comprising forecasting a value for one of the plurality of items needed over a future period of time.

17. A data collection, management, and forecasting computer system comprising:

a datastore one or more processors; and one or more non-transitory computer readable memory storing instructions which when executed by the one or more processors causes the computer system to reduce a data storage capacity requirement for the computer system and increase the one or more processors' processing speed by:

collecting historical data for a plurality of items;

storing the historical data for a plurality of items in a first part of the datastore;

categorizing each of the plurality of items;

storing a categorization of each of the plurality of items in a second part of the datastore;

assigning at least one of the plurality of items as an index item for at least another of the plurality of items, wherein the assigning enables forecasting a value;

collecting data for a plurality of context parameters related to at least one of the plurality of items;

storing the historical data for the plurality of context parameters in a third part of the datastore; and forecasting a value for one of the plurality of items needed over a future period of time, wherein forecasting the value comprises:

use a first factor and a second factor with reference to a first context parameter of the plurality of context parameters to calculate the forecast value of the one of the plurality of items needed over the future period of time, if a period of time for the historical data collected for the one of the plurality of items needed over the future period of time with reference to the first context parameter is above a first threshold, wherein the first factor and the second factor are related to the plurality of items, use the first factor of the one of the plurality of items needed over the future period of time with reference to the first context parameter of the plurality of context parameters and using a second factor of the index item with reference to the first context parameter, to calculate the forecast value of the one of the plurality of items needed over the future period of time, if the period of time for the historical data collected for the one of the plurality of items needed over the future period of time is below the first threshold with reference to the first context parameter and above a second threshold with reference to the first context parameter, and if a period of time for the historical data collected for the index item with reference to the first context parameter is greater than a third threshold;

use the first factor of the one of the plurality of items needed over the future period of time with reference to the first context parameter of the plurality of context parameters and using the second factor of the index item with reference to an index context parameter of the plurality of context parameters, to calculate the forecast value of the one of the plurality of items needed over the future period of time, if the period of time for the historical data collected for the one of the plurality of items needed over the future period of time is below the first threshold with reference to the first context parameter and above the second threshold with reference to the first context parameter, and if the period of time for the historical data collected for the index item with reference to the first context parameter is less than the third threshold;

use the first factor of the index item with reference to the first context parameter and using the second factor of the index item with reference to the first context parameter, to calculate the forecast value of the one of the plurality of items needed over the future period of time, if the period of time for the historical data collected for the one of the plurality of items needed over the future period of time is below the first threshold with reference to the first context parameter and below the second threshold with reference to the first context parameter, and if the period of time for the historical data collected for the index item with reference to the first context parameter is greater than the third threshold;

use the first factor of the index item with reference to the first context parameter and using the second factor of the index item with reference to the index context parameter, to calculate the forecast value of the one of the plurality of items needed over the future period of time, if the period of time for the historical data collected for the one of the plurality of items needed over the future period of time is below the first threshold with reference to the first context parameter and below the second threshold with reference to the first context parameter, if the period of time for the historical data collected for the index item with reference to the first context parameter is less than the third threshold, and if the period of time for the historical data collected for the index item with reference to the first context parameter is greater than a fourth threshold; or (6) use the first factor of the index item with reference to the index context parameter and using the second factor of the index item with reference to the index context parameter, to calculate the forecast value of the one of the plurality of items needed over the future period of time, if the period of time for the historical data collected for the one of the plurality of items is below the first threshold with reference to the first context parameter and below the second threshold with reference to the first context parameter, if the period of time for the historical data collected for the index item with reference to the first context parameter is less than the third threshold, and if the period of time for the historical data collected for the index item with reference to the first context parameter is less than the fourth threshold.

* * * * *